United States Patent [19]
Magee

[11] Patent Number: 6,007,273
[45] Date of Patent: Dec. 28, 1999

[54] ARRANGEMENT AND METHOD FOR COOLING A BEARING ASSEMBLY

[75] Inventor: Kevin J. Magee, Buffalo, Minn.

[73] Assignee: Caterpillar Inc., Peoria, Ill.

[21] Appl. No.: 09/176,992

[22] Filed: Oct. 22, 1998

[51] Int. Cl.$^6$ .................................................... E01K 19/23
[52] U.S. Cl. ........................................... 404/122; 404/130
[58] Field of Search ................................... 404/122, 124, 404/129, 130; 384/1, 93, 99, 100, 163, 164, 165, 290, 467, 476, 316

[56] References Cited

U.S. PATENT DOCUMENTS

| Re. 27,840 | 12/1973 | Kronholm | 404/122 |
|---|---|---|---|
| 1,237,634 | 8/1917 | Gratton | 404/122 |
| 3,298,292 | 1/1967 | Wylie | 404/122 |

*Primary Examiner*—Rubert E. Pezzuto
*Assistant Examiner*—Raymond W. Addie
*Attorney, Agent, or Firm*—Maginot, Addison & Moore

[57] ABSTRACT

An arrangement for cooling a bearing assembly. The arrangement includes a drum assembly having (i) a drum member having an interior sidewall, (ii) a first bulkhead secured to the interior sidewall, (iii) a second bulkhead secured to the interior sidewall, (iv) an interior cavity defined by the interior sidewall, the first bulkhead, and the second bulkhead, (v) a drive plate secured to the drum member, (vi) a planetary gear box secured to the drive plate, and (vii) a drive motor mechanically coupled to the planetary gear box such that actuation of the drive motor causes the drum member to rotate around a central axis thereof. The arrangement also includes a first bearing assembly positioned within the interior cavity. The arrangement further includes a first dipping member having a first dipping cavity defined therein. The first dipping member is positioned within the interior cavity, wherein when a first volume of cooling liquid is positioned within the interior cavity, rotation of the drum member around a central axis thereof causes (i) the dipping member to be advanced through the first volume of cooling liquid such that a second volume of cooling liquid is captured within the dipping cavity and (ii) the second volume of cooling liquid to be poured out of the dipping cavity such that the second volume of cooling liquid contacts the bearing assembly. An associated method of cooling a bearing assembly.

17 Claims, 3 Drawing Sheets

ARRANGEMENT AND METHOD FOR
COOLING A BEARING ASSEMBLY

TECHNICAL FIELD OF THE INVENTION

The present invention relates generally to an arrangement and method for cooling a bearing assembly, and more particularly to an arrangement and method for cooling a bearing assembly contained within an interior cavity of a drum member.

BACKGROUND OF THE INVENTION

Work machines, such as vibratory soil compactors, typically include a drum assembly. The drum assembly functions to compact the soil over which the work machine is driven. In order to compact the soil, the drum assembly typically includes at least one bearing assembly positioned within an interior cavity of the drum assembly. The bearing assembly includes a lobe weight eccentrically mounted on a bearing member such that rotation of the lobe weight on the bearing member causes the drum assembly to vibrate. The aforementioned vibration results in soil being compacted as the drum assembly is rolled over the ground.

A problem with the above described arrangement is that the bearing assembly becomes very hot as the lobe weight is rotated on the bearing member. Heating the bearing assembly to a relatively high temperature can result in damage to the bearing assembly which increases the maintenance cost of the work machine.

In an attempt to address the aforementioned problem, some drum assembly designs simply depend upon the heat being conducted away from the bearing assembly through the various components of the drum assembly. However, this approach is relatively inefficient and under certain conditions still allows the bearing assembly to overheat.

What is needed therefore is an arrangement for cooling a bearing assembly which overcomes the above-mentioned drawback.

DISCLOSURE OF THE INVENTION

In accordance with a first embodiment of the present invention, there is provided a drum assembly for use on a work machine. The drum assembly includes a drum member having an interior cavity. The drum assembly also includes a bearing assembly positioned within the interior cavity. The drum assembly further includes a dipping member positioned within the interior cavity and having a dipping cavity defined therein, wherein when a first volume of cooling liquid is positioned within the interior cavity, rotation of the drum member around a central axis thereof causes (i) the dipping member to be advanced through the first volume of cooling liquid such that a second volume of cooling liquid is captured within the dipping cavity and (ii) the second volume of cooling liquid to be poured out of the dipping cavity such that the second volume of cooling liquid contacts the bearing assembly.

In accordance with a second embodiment of the present invention, there is provided an arrangement for cooling a bearing assembly. The arrangement includes a drum assembly having (i) a drum member having an interior sidewall, (ii) a first bulkhead secured to the interior sidewall, (iii) a second bulkhead secured to the interior sidewall, (iv) an interior cavity defined by the interior sidewall, the first bulkhead, and the second bulkhead, (v) a drive plate secured to the drum member, (vi) a planetary gear box secured to the drive plate, and (vii) a drive motor mechanically coupled to the planetary gear box such that actuation of the drive motor causes the drum member to rotate around a central axis thereof. The arrangement also includes a first bearing assembly positioned within the interior cavity. The arrangement further includes a first dipping member having a first dipping cavity defined therein. The first dipping member is positioned within the interior cavity, wherein when a first volume of cooling liquid is positioned within the interior cavity, rotation of the drum member around a central axis thereof causes (i) the dipping member to be advanced through the first volume of cooling liquid such that a second volume of cooling liquid is captured within the dipping cavity and (ii) the second volume of cooling liquid to be poured out of the dipping cavity such that the second volume of cooling liquid contacts the bearing assembly.

In accordance with a third embodiment of the present invention, there is provided a method of cooling a bearing assembly contained within an interior cavity of a drum member of a drum assembly of a work machine. The method includes the steps of (i) rotating the drum member around a central axis thereof so as to cause a dipping member to be advanced through a first volume of cooling liquid positioned within the interior cavity such that a second volume of cooling liquid is captured within the dipping cavity and (ii) further rotating the drum member around the central axis so as to cause the second volume of cooling liquid to be poured out of the dipping cavity such that the second volume of cooling liquid contacts the bearing assembly.

BEST MODE FOR CARRYING OUT THE INVENTION

Figure 1:
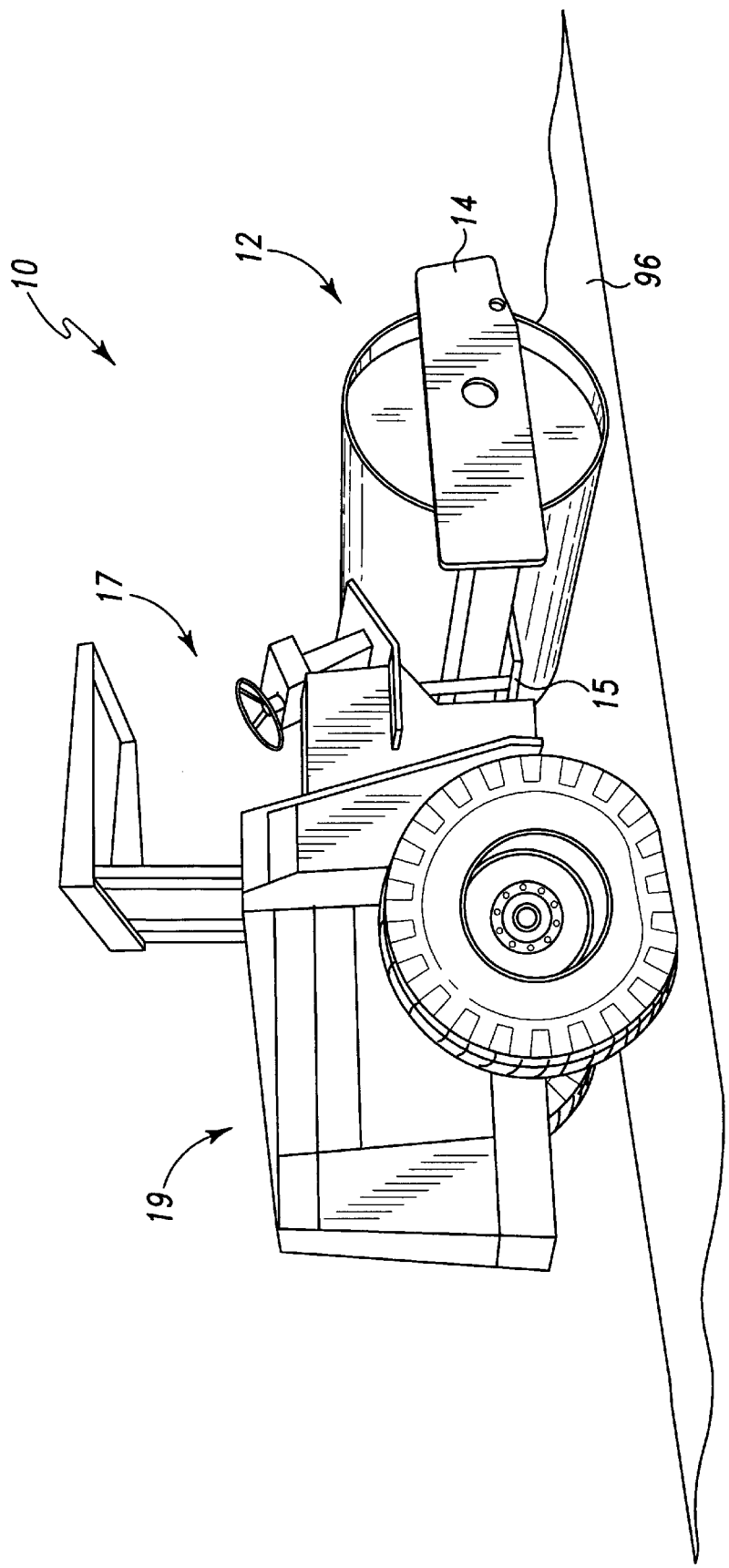
FIG. 1 is a perspective view of a work machine having a drum assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a work machine 10, such as a vibratory soil compactor, which incorporates the features of the present invention therein. Work machine 10 includes a main frame 15, an operator station 17, an engine compartment 19, a forward frame 14, and a drum assembly 12. Operator station 17 and engine compartment 19 are mounted on main frame 15. Forward frame 14 is pivotally coupled to main frame 15.

Figure 2:
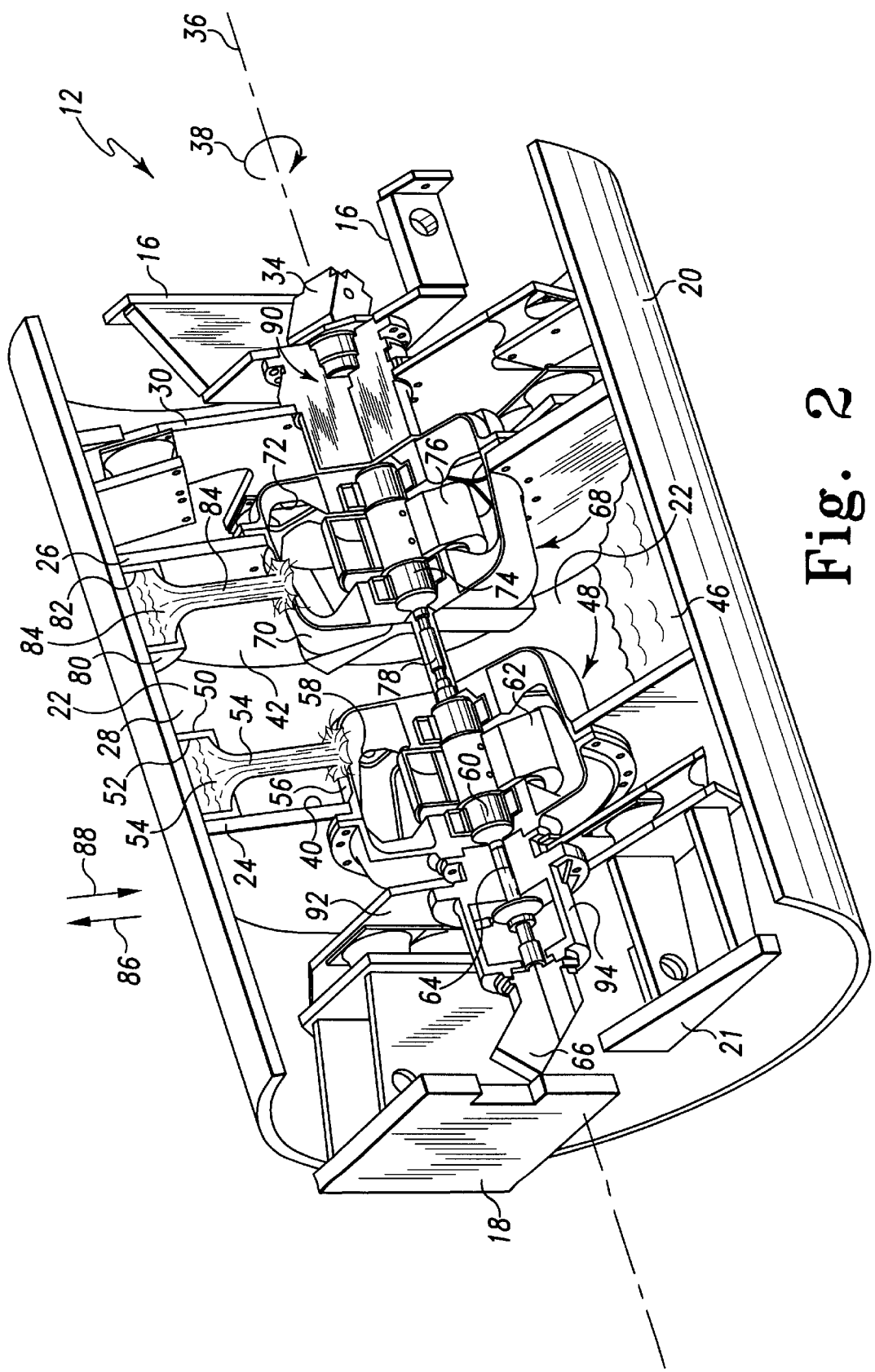
FIG. 2 is a fragmentary perspective view of the drum assembly of the work machine of FIG. 1.
Figure 3:
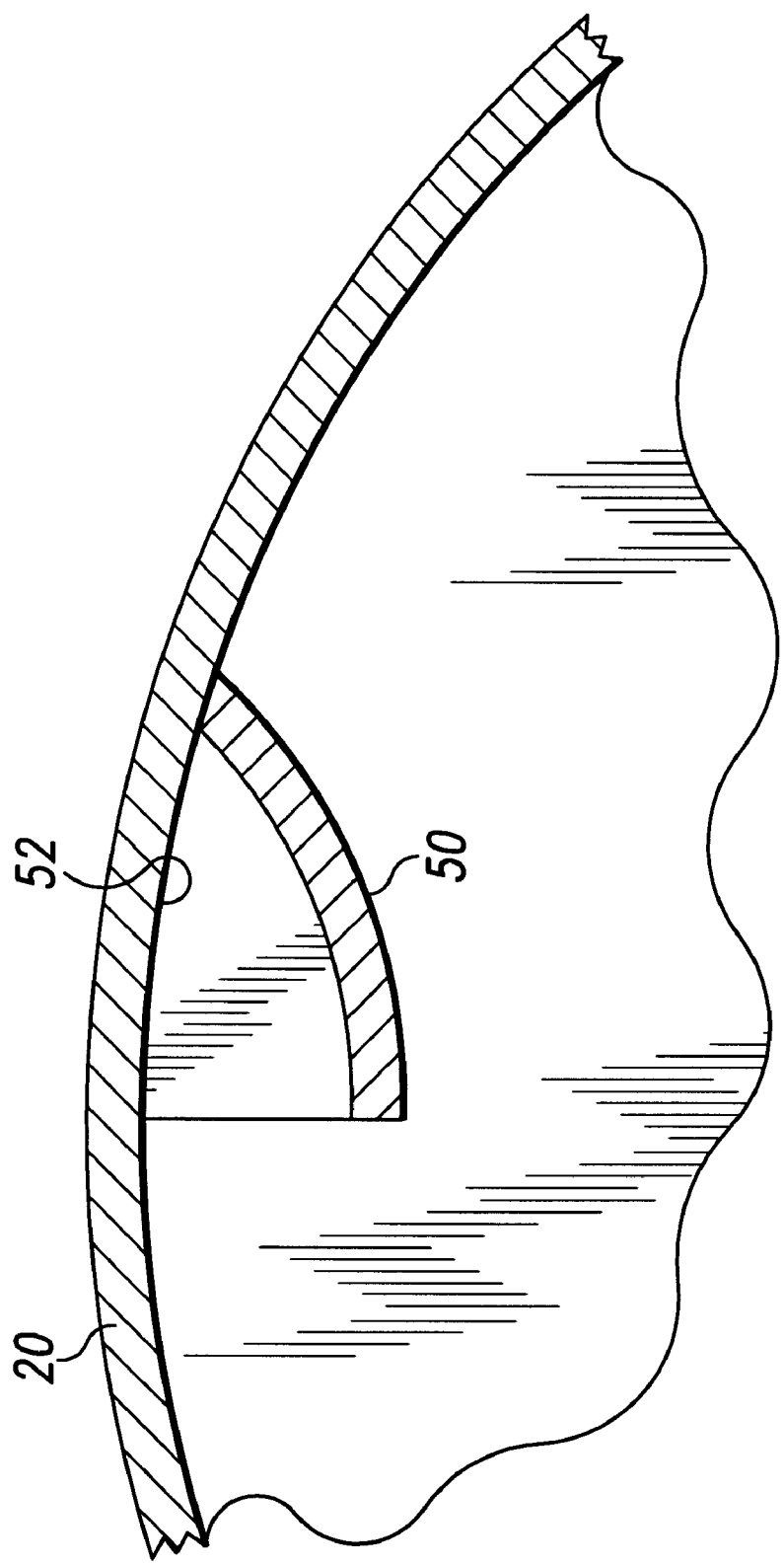
FIG. 3 is a cross sectional view of a dipping member of the drum assembly of FIG. 1.

Referring now to FIG. 2, drum assembly 12 includes a drum member 20 having an interior sidewall 22, a bulkhead 24 having a bulkhead sidewall 40, and a bulkhead 26 having a bulkhead sidewall 42. Drum assembly 12 also includes a drive plate 30, a planetary gear box 90 housing a number of planetary gears (not shown), a support plate 92, and a drive motor 34. Drum assembly 12 further includes drum frames 16, 18, and 21, a bearing assembly 48, a bearing assembly 68, a bearing motor 66, a dipping member 50, and a dipping member 80. Dipping member 50 has a dipping cavity 52 defined therein as shown in FIG. 3. Dipping member 80 also has a dipping cavity 82 defined therein. It should be appreciated that the dipping member 50 and dipping member 80 are constructed in a substantially identical manner.

Bearing assembly 48 includes a bearing housing 56 which defines a bearing cavity 58. Bearing assembly 48 also includes a roller bearing 60 positioned within bearing cavity 58. In addition, bearing assembly 48 includes a lobe weight 62 mounted on roller bearing 60. Bearing cavity 58 has a volume of oil (not shown) contained therein which lubricates and cools roller bearing 60 during use.

In a similar fashion, bearing assembly 68 includes a bearing housing 70 which defines a bearing cavity 72. Bearing assembly 68 also includes a roller bearing 74 positioned within bearing cavity 72. In addition, bearing assembly 68 includes a lobe weight 76 mounted on roller bearing 74. Bearing cavity 72 has a volume of oil (not shown) contained therein which lubricates and cools roller bearing 74 during use.

Bulkhead 24 and bulkhead 26 are secured to interior sidewall 22 (e.g. by welding) such that bulkhead sidewall 40, bulkhead sidewall 42, and interior sidewall 22 define a sealed interior cavity 28. A first volume of a cooling liquid 46 is positioned within interior cavity 28. For example, hydraulic fluid can be utilized as cooling liquid 46.

Bearing assembly 48 is secured to bulkhead 24 via a number of bolts such that a portion of bearing housing 56 extends through bulkhead 24 and is positioned within interior cavity 28. In a similar fashion, bearing assembly 68 is secured to bulkhead 26 via a number of bolts such that a portion of bearing housing 70 extends through bulkhead 26 and is positioned within interior cavity 28. It should be understood that positioning and securing bearing assembly 48 and bearing assembly 68 in the above described manner spaces bearing housing 56 and bearing housing 70 vertically above the first volume of cooling liquid 46.

Support plate 92 is supported by bearings (not shown) in axle housing 94 such that support plate 92 is located (i) adjacent to bulkhead 24 and (ii) exterior to interior cavity 28. Drum frames 18 and 21 are secured to support plate 92. In addition, an axle housing 94 is attached to support plate 92 such that axle housing 94 extends through support plate 92 and contacts bearing housing 56.

Bearing motor 66 is mounted on axle housing 94 such that bearing motor 66 is interposed between drum frames 18 and 21. A bearing axle 64 is positioned within axle housing 94 such that one end of bearing axle 64 is mechanically coupled to roller bearing 60 while the other end is mechanically coupled to bearing motor 66. A cross shaft 78 is positioned within interior cavity 28 such that cross shaft 78 is interposed between bearing housing 56 and bearing housing 70. In addition, one end of cross shaft 78 extends through bearing housing 56 and is mechanically coupled to roller bearing 60. In a similar manner, the other end of cross shaft 78 extends through bearing housing 70 and is mechanically coupled to roller bearing 74.

Drive plate 30 is secured to interior sidewall 22 of drum member 20 such that drive plate 30 is located (i) adjacent to bulkhead 26 and (ii) exterior to interior cavity 28. Planetary gear box 90 is secured to drive plate 30 with a number of bolts. Drive motor 34 is mechanically coupled to planetary gear box 90 via a number of planetary gears contained within planetary gear box 90. Drum frame 16 is secured to planetary gear box 90 with a number of bolts. Note that assembling drive plate 30, planetary gear box 90, and drive motor 34 in the above described manner results in drum member 20 being rotated around a central axis 36 when drive motor 34 is actuated. For example, drum member 20 can be rotated in a direction indicated by arrow 38.

Dipping member 50 is positioned within interior cavity 28 and secured to bulkhead sidewall 40 and interior sidewall 22. In a similar fashion, dipping member 80 is positioned within interior cavity 28 and secured to bulkhead sidewall 42 and interior sidewall 22. It should be appreciated that securing dipping member 50 in the above described manner spaces dipping member 50 apart from bearing housing 56. It should also be appreciated that securing dipping member 80 in the above described manner spaces dipping member 80 apart from bearing housing 70.

Drum frames 16, 18, and 21 are each attached to forward frame 14 of work machine 10 so as to position drum assembly 12 in front of operator station 17 as shown in FIG. 1.

Industrial Applicability

During use of work machine 10 an operator (not shown) actuates drive motor 34 such that drum member 20 rotates around central axis 36 in the direction indicated by arrow 38. Rotating drum member 20 in the above described manner facilitates work machine 10 being moved over ground 96 (see FIG. 1). In addition, the operator of work machine 10 actuates bearing motor 66 which causes bearing axle 64, roller bearing 60, cross shaft 78, and roller bearing 74 to rotate around central axis 38.

Rotating roller bearing 60 and roller bearing 74 as described above also causes lobe weight 62 and lobe weight 76 to rotate around central axis 38. Rotating lobe weights 62 and 76 causes drum member 20 to vibrate in the directions indicated by arrows 86 and 88. The above described vibration results in soil being compacted as drum member 20 is rolled over ground 96 (see FIG. 1).

It should be appreciated that rotating roller bearings 60 and 74 in the aforementioned manner causes the temperature of roller bearings 60 and 74 to increase. Heating roller bearings 60 and 74 also causes the temperature of the oil contained within bearing cavity 58 and bearing cavity 72 to respectively increase. Increasing the temperature of the oil contained within bearing cavities 58 and 72 also results in bearing housing 56 and bearing housing 70 being heated. Increasing the temperature of the aforementioned components can be detrimental to bearing assemblies 48 and 68. For example, if the temperature of bearing assemblies 48 and 68 becomes to high the viscosity of the oil contained therein can decrease to a point where roller bearings 60 and 74 are not adequately lubricated.

However, it should be understood that as roller assembly 20 rotates around central axis 36, dipping member 50 and dipping member 80 are advanced through the first volume of cooling liquid 46 pooled within interior chamber 28. Rotating dipping member 50 through the first volume of cooling liquid 46 causes a second volume of cooling liquid 54 (see FIG. 2) to be positioned within dipping cavity 52 of dipping member 50. Similarly, rotating dipping member 80 through the first volume of cooling liquid 46 causes a third volume of cooling liquid 84 (see FIG. 2) to be positioned within dipping cavity 82 of dipping member 80.

As rolling member 20 is further rotated around central axis 36 the second volume of cooling liquid 54 is poured out of dipping member 50 such that the second volume of cooling liquid 54 contacts bearing housing 56. In a substantially identical manner, the third volume of cooling liquid 84 is simultaneously poured out of dipping member 80 such that the third volume of cooling liquid 84 contacts bearing housing 70. After contacting bearing housings 56 and 70 the second volume of cooling liquid 54 and the third volume of cooling liquid 84 reenter the first volume of cooling liquid 46 pooled within interior chamber 28. The above described cycle of dipping and pouring cooling liquid over bearing houses 56 and 70 continuously repeats itself as long as drum member 20 is being rotated around central axis 36 in the direction of arrow 36.

The cycle of dipping and pouring cooling liquid over bearing houses 56 and 70 is an important aspect of the present invention since it ensures that bearing assemblies 48 and 68 remain relatively cool. In particular, as the second volume of cooling liquid 54 and the third volume of cooling liquid 84 respectively contact bearing housing 56 and bearing housing 70 heat is transferred via convection from the respective bearing assemblies 48 and 68 to the second and third volumes of cooling liquid 54 and 84. Transferring heat from bearing assemblies 48 and 68 to the second and third volumes of cooling liquid 54 and 84 cools bearing assemblies 48 and 68. After the second and third volumes of cooling liquid 54 and 84 reenter the first volume of cooling liquid 46 pooled within interior chamber 28 the heat is transferred to drum member 20 via convection. Once the heat is transferred to drum member 20, the heat is dissipated to the environment via convective air currents in contact with drum member 20. The heat is also dissipated to the environment via conduction to the soil in contact with drum member 20. Thus, the present invention ensures that bearing assemblies 48 and 68 remain relatively cool during the use of work machine 10.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A drum assembly for use on a work machine, comprising:
    a drum member having an interior cavity;
    a bearing assembly positioned within said interior cavity; and
    a dipping member positioned within said interior cavity and having a dipping cavity defined therein,
    wherein when a first volume of cooling liquid is positioned within said interior cavity, rotation of said drum member around a central axis thereof causes (i) said dipping member to be advanced through said first volume of cooling liquid such that a second volume of cooling liquid is captured within said dipping cavity and (ii) said second volume of cooling liquid to be poured out of said dipping cavity such that said second volume of cooling liquid contacts said bearing assembly.

2. The drum assembly of claim 1, further comprising:
    a first bulkhead secured to an interior sidewall of said drum member; and
    a second bulkhead spaced apart from said first bulkhead and secured to said interior sidewall of said drum member,
    wherein said interior sidewall, said first bulkhead, and said second bulkhead define said interior cavity of said drum member.

3. The drum assembly of claim 2, wherein said bearing assembly includes:
    a bearing housing which defines a bearing cavity;
    a roller bearing positioned within said bearing cavity; and
    a lobe weight mounted on said roller bearing,
    wherein said second volume of cooling liquid is poured out of said dipping member such that said second volume of cooling liquid contacts said bearing housing.

4. The drum assembly of claim 3, wherein said bearing housing is secured to said first bulkhead.

5. The drum assembly of claim 3, further comprising:
    a bearing axle mechanically coupled to said roller bearing; and
    a bearing motor mechanically coupled to said bearing axle,
    wherein actuation of said bearing motor causes said bearing axle, said roller bearing, and said lobe weight to rotate relative to said bearing housing.

6. The drum assembly of claim 1, wherein:
    a drive plate is secured to said drum member;
    a planetary gear box is secured to said drive plate; and
    a drive motor is mechanically coupled to said planetary gear box such that actuation of said drive motor causes said drum member to rotate around said central axis.

7. An arrangement for cooling a bearing assembly, comprising:
    a drum assembly which includes (i) a drum member having an interior sidewall, (ii) a first bulkhead secured to said interior sidewall, (iii) a second bulkhead secured to said interior sidewall, (iv) an interior cavity defined by said interior sidewall, said first bulkhead, and said second bulkhead, (v) a drive plate secured to said drum member, (vi) a planetary gear box secured to said drive plate, and (vii) a drive motor mechanically coupled to said planetary gear box such that actuation of said drive motor causes said drum member to rotate around a central axis thereof;
    a first bearing assembly positioned within said interior cavity; and
    a first dipping member having a first dipping cavity defined therein, said first dipping member being positioned within said interior cavity,
    wherein when a first volume of cooling liquid is positioned within said interior cavity, rotation of said drum member around a central axis thereof causes (i) said dipping member to be advanced through said first volume of cooling liquid such that a second volume of cooling liquid is captured within said dipping cavity and (ii) said second volume of cooling liquid to be poured out of said dipping cavity such that said second volume of cooling liquid contacts said bearing assembly.

8. The arrangement of claim 7, wherein said first bearing assembly includes:
    a first bearing housing which defines a first bearing cavity;
    a first roller bearing positioned within said first bearing cavity; and
    a first lobe weight mounted on said first roller bearing,
    wherein said second volume of cooling liquid is poured out of said first dipping cavity such that said second volume of cooling liquid contacts said first bearing housing.

9. The arrangement of claim 8, wherein said first bearing housing is secured to said first bulkhead.

10. The arrangement of claim 8, further comprising:
    a bearing axle mechanically coupled to said first roller bearing; and a bearing motor mechanically coupled to said bearing axle, wherein actuation of said bearing motor causes said bearing axle, said first roller bearing, and said first lobe weight to rotate relative to said first bearing housing.

11. The arrangement of claim 9, further comprising:

a second bearing assembly positioned within said interior cavity, said second bearing assembly having (i) a second bearing housing which defines a second bearing cavity, (ii) a second roller bearing positioned within said second bearing cavity, and (iii) a second lobe weight mounted on said second roller bearing, wherein said second bearing housing is secured to said second bulkhead.

12. The arrangement of claim 11, further comprising:

a bearing axle mechanically coupled to said first roller bearing;

a bearing motor mechanically coupled to said bearing axle; and a cross shaft mechanically coupled to said first roller bearing and said second roller bearing, wherein actuation of said bearing motor causes said bearing axle, said first roller bearing, said first lobe weight, said cross shaft, said second roller bearing, and said second lobe weight to rotate relative to said first bearing housing and said second bearing housing.

13. The arrangement of claim 11, further comprising:

a second dipping member having a second dipping cavity defined therein, said second dipping member being positioned within said interior cavity so that rotation of said drum assembly around said central axis thereof causes (i) said second dipping member to be advanced through said first volume of cooling liquid such that a third volume of cooling liquid is positioned within said second dipping cavity and (ii) said third volume of cooling liquid to be poured out of said second dipping cavity such that said third volume of cooling liquid contacts said second bearing assembly.

14. A method of cooling a bearing assembly contained within an interior cavity of a drum member of a drum assembly of a work machine, comprising the steps of:

rotating said drum member around a central axis thereof so as to cause a dipping member to be advanced through a first volume of cooling liquid positioned within said interior cavity such that a second volume of cooling liquid is captured within said dipping cavity; and further rotating said drum member around said central axis so as to cause said second volume of cooling liquid to be poured out of said dipping cavity such that said second volume of cooling liquid contacts said bearing assembly.

15. The method of claim 14, wherein:

said bearing assembly includes (i) a bearing housing which defines a bearing cavity, (ii) a roller bearing positioned within said bearing cavity, and (iii) a lobe weight mounted on said roller bearing, and said further rotating step including the step of pouring said second volume of cooling liquid out of said dipping cavity so that said second volume of cooling liquid contacts said bearing housing.

16. The method of claim 15, wherein (i) a bearing axle is mechanically coupled to said roller bearing, and (ii) a bearing motor mechanically coupled to said bearing axle, further comprising the step of:

operating said bearing motor so as to cause said bearing axle, said roller bearing, and said lobe weight to rotate relative to said bearing housing.

17. The method of claim 14, wherein (i) a drive plate is secured to said drum member, (ii) a planetary gear box is secured to said drive plate, and (iii) drive motor is mechanically coupled to said planetary gear box, further comprising the step of:

operating said drive motor so as to cause said drum member to rotate around said central axis.

* * * * *